(12) United States Patent
Wardlaw et al.

(10) Patent No.: US 11,501,033 B2
(45) Date of Patent: Nov. 15, 2022

(54) MODEL-BASED SYSTEMS ENGINEERING MODEL CONVERSION WITH TEXT REQUIREMENTS

(71) Applicant: The Boeing Company, Chicago, IL (US)

(72) Inventors: William Scott Wardlaw, Huntsville, AL (US); Michael E. Crow, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 263 days.

(21) Appl. No.: 16/594,710

(22) Filed: Oct. 7, 2019

(65) Prior Publication Data

US 2021/0103639 A1   Apr. 8, 2021

(51) Int. Cl.
| | | |
|---|---|---|
| *G06F 30/18* | (2020.01) | |
| *G06F 30/20* | (2020.01) | |
| G06F 8/20 | (2018.01) | |
| G06F 8/10 | (2018.01) | |
| G06Q 10/06 | (2012.01) | |

(52) U.S. Cl.
CPC .............. *G06F 30/18* (2020.01); *G06F 30/20* (2020.01); *G06F 8/10* (2013.01); *G06F 8/20* (2013.01); *G06Q 10/06* (2013.01)

(58) Field of Classification Search
CPC ... G06F 8/10; G06F 30/20; G06F 8/20; G06F 30/18; G06Q 10/06
See application file for complete search history.

(56) References Cited

U.S. PATENT DOCUMENTS

| 5,109,380 A | * | 4/1992 | Ogino | G06F 11/2257 706/913 |
| 8,266,578 B2 | * | 9/2012 | Bazigos | G06F 11/3604 717/101 |
| 2005/0105712 A1 | * | 5/2005 | Williams | G10L 13/027 704/275 |
| 2006/0064178 A1 | * | 3/2006 | Butterfield | G06F 8/20 700/18 |
| 2014/0075357 A1 | * | 3/2014 | Flores | H04L 41/142 715/771 |
| 2014/0380488 A1 | * | 12/2014 | Datta Ray | G06Q 10/0635 726/25 |

(Continued)

*Primary Examiner* — Kibrom K Gebresilassie
(74) *Attorney, Agent, or Firm* — MH2 Technology Law Group LLP (57) ABSTRACT

A computer-implemented method for converting an architecture specification of a system to one or more functional performance requirements textual statements describing one or more functions of the system is provided. The computer-implemented method includes obtaining the architecture specification based on a predefined architecture model diagram type, wherein the architecture specification comprises a plurality of interconnected functional portions that describe the one or more functions of the system; mapping one or more of the plurality of interconnected functional portions to one or more portions of the one or more functional performance requirements textual statements based on a predefined format of a template functional performance requirements textual statement; and creating the one or more functional performance requirements textual statements based on the mapping.

20 Claims, 9 Drawing Sheets

(56) References Cited

U.S. PATENT DOCUMENTS

2016/0147522 A1* 5/2016 Dimitrakos ............... G06F 8/61
  717/174
2021/0103639 A1* 4/2021 Wardlaw ................. G06F 30/18

* cited by examiner

Links View in DNG

| ID | Name | Agent | Interface Input | Condition | Interface Output | To State |
|---|---|---|---|---|---|---|
| 2243 | Light_Red/pFarmRoad.Green | 1977:TLS_Controller | 2219:Current_Color | 2059:Farmroad_Red_Highwa... | 2216:Requested_Color | 2067:Highway_Red_Farmroa... |
| 2244 | Light_Green/pTimer.Start(LTI) | 1977:TLS_Controller | 2219:Current_Color | 2067:Highway_Red_Farmroa... | 2222:Start | 206?:Highway_Red_Farmroa... |
| 2245 | Vehicle_Absent/pTimer.Reset pFarm | TLS_Controller | 2214:Vehicle_Present_Ab... | 2066:Highway_Red_Farmroa... | 2222:Reset | 206?:hway_Red_Farmroa... |
| 2246 | LightGreen | Controller | 2219:Current_Color | 2059:Farmroad_Red_Highwa... | 2216:Requested_Color |  |
| 2247 | Light_ | Controller | 221?:Current_Color | 205?:road_Red_Highwa... |  |  |
| 2248 | TimeUpd | Controller | 22?:ent_Color | 20?:ad_Red_Farmroa... |  |  |
| 2249 | /pTimer.Start(LTI) | 1977:TLS_Controller | 2220:TimeUp | 2064:Time_Out_Expired |  | 2063:terminationstate_13 |
| 2250 | Vehicle_Present | 1977:TLS_Controller | 2214:Vehicle_Present_Ab... | 2064:Time_Out_Expired |  | 2063:terminationstate_13 |
| 2251 | TimeUp | 1977:TLS_Controller |  |  |  |  |
| 2252 | TimeUp | 1977:TLS_Controller |  |  |  |  |
| 2253 | Vehicle_Present | 1977:TLS_Controller |  |  |  |  |
| 2254 | No Title | 1978:Traffic_Signal |  |  |  | 2071:Off |
| 2255 | Power_On | 1978:Traffic_Signal | 2215:Discrete Power | 2071:Off |  | 2072:On |
| 2256 | Power_Off | 1978:Traffic_Signal | 2215:Discrete Power | 2072:On |  | 2071:Off |
| 2257 | No Title | 1978:Traffic_Signal |  |  |  | 2073:Flashing |
| 2258 | Start_Normal_Operation | 1978:Traffic_Signal | 2212:Operational Mode | 2073:Flashing |  | 2075:Operating |

Callouts: "The Controller shall", "Upon receiving this data", "While in this state", "Produce this output", "And transition to this state"

FIG. 4

| S33 | ▼ | : | × | ✓ | fx | = "The " & C33 & " shall " & J33 & L33 & E33 & N33 & R33 |
|---|---|---|---|---|---|---|

| # | A | S |
|---|---|---|
| 1 | Autogenerated Text | |
| 32 | The Traffic_Signal shall transition to the Off state upon Initialization | |
| 33 | The Traffic_Signal shall transition to the On state upon receiving Power_On in accordance with Interface Power(2215) while in the Off state | |
| 34 | The Traffic_Signal shall transition to the Off state upon receiving Power_Off in accordance with Interface Power(2215) while in the On state | |
| 35 | The Traffic_Signal shall transition to the Flashing state upon entering the On State | |
| 36 | The Traffic_Signal shall transition to the Operating state upon receiving Start_Normal_Operation in accordance with Interface Operational Mode(2212) while in the Flashing state | |
| 37 | The Traffic_Signal shall transition to the Flashing state upon receiving Start_Flashing in accordance with Interface Operational Mode(2212) while in the Operating state | |
| 38 | The Traffic_Signal shall send the pDriver.Red message in accordance with the Red_Light (2223) upon entering the Operating State | |
| 39 | The Traffic_Signal shall send the pControl.Light_Red message in accordance with the Current Color (2219) and subsequently transition to the Red state upon completing the Function | |
| 40 | The Traffic_Signal shall send the pDriver.Green message in accordance with the Green_Light (2225) upon receiving Turn_Green in accordance with Interface Requested Color(2216) while in the Red state | |
| 41 | The Traffic_Signal shall send the pControl.Light_Green message in accordance with the Current Color (2219) and subsequently transition to the Green state upon completing the Function | |
| 42 | The Traffic_Signal shall send the pDriver.Amber message in accordance with the Amber Light (2224) upon receiving Turn_Red in accordance with Interface Requested Color(2216) while in the Green state | |
| 43 | The Traffic_Signal shall send the Start STI Countdown message in accordance with the Start (2222) and subsequently transition to the Amber state upon completing the Function | |
| 44 | The Traffic_Signal shall send the pDriver.Red message in accordance with the Red_Light (2223) upon receiving TimeUp[Time Out] in accordance with Interface TimeUp(2220) while in the Amber state | |
| 45 | The Traffic_Signal shall send the pControl.Light_Red message in accordance with the Current Color (2219) and subsequently transition to the Red state upon completing the Function | |

MODEL-BASED SYSTEMS ENGINEERING MODEL CONVERSION WITH TEXT REQUIREMENTS

FIELD

The present disclosure relates to systems and methods for model-based systems engineering model conversion with text requirements.

BACKGROUND

Requirement quality has long been an issue of large programs. The implementation of model-based systems engineering (MBSE) allows for an increase in quality and common understanding of the systems and subsystems being modeled prior to their construction. However, these additional MBSE tools can cause additional manual work by determining tracing links and creating the MBSE models themselves, even when there exists text requirements of equivalent meaning.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In accordance with examples of the present disclosure, a computer-implemented method for converting an architecture specification of a system to one or more functional performance requirements textual statements describing one or more functions of the system is provided. The computer-implemented method comprises obtaining the architecture specification mapping based on a predefined architecture model diagram type, wherein the architecture specification mapping comprises a plurality of interconnected functional portions that describe the one or more functions of the system; mapping one or more of the plurality of interconnected functional portions to one or more portions of the one or more functional performance requirements textual statements based on a pre-defined format of a template functional performance requirements textual statement; and creating the one or more functional performance requirements textual statements based on the mapping.

In accordance with examples of the present disclosure, a computer-implemented method for converting one or more functional performance requirements textual statements describing one or more functions of a system to an architecture specification mapping of the system is provided. The computer-implemented method comprises obtaining the one or more functional performance requirements textual statements; mapping one or more portions of the one or more functional performance requirements textual statements to one or more of a plurality of interconnected functional portions of the architecture specification mapping based on a pre-defined format of a template functional performance requirements textual statement; and creating the architecture specification based on the mapping, wherein the architecture specification comprises a plurality of interconnected functional portions that describe the one or more functions of the system.

In accordance with examples of the present disclosure, a computer system is provided that comprises a hardware processor; a non-transitory computer readable medium storing instructions that cause the hardware processor to perform a computer-implemented method for converting an architecture specification of a system to one or more functional performance requirements textual statements describing one or more functions of the system, the computer-implemented method comprising: obtaining the architecture specification based on a predefined architecture model diagram type, wherein the architecture specification comprises a plurality of interconnected functional portions that describe the one or more functions of the system; mapping one or more of the plurality of interconnected functional portions to one or more portions of the one or more functional performance requirements textual statements based on a pre-defined format of a template functional performance requirements textual statement; and creating the one or more functional performance requirements textual statements based on the mapping.

In some examples, the predefined architecture model diagram type is a state transition diagram, from which, one or more functional performance requirements textual statements are derived from one or more transitions in the state transition diagram.

In some examples, the predefined format comprises a subject that is a component of the system, a verb that is an action performed by the component, and a clause that comprises one or more parameters on the action.

In some examples, the subject is linked to an agent block of the plurality of interconnected functional portions, the verb is linked to one or more verb-type elements of the plurality of interconnected functional portions, and the clause is linked to one or more clause-type elements of the plurality of interconnected functional portions.

BRIEF DESCRIPTION OF THE FIGURES

The accompanying drawings, which are incorporated in, and constitute a part of this specification, illustrate implementations of the present teachings and, together with the description, serve to explain the principles of the disclosure.

FIG. 3 shows a links view in a raw image file format according to examples of the present disclosure.

FIG. 5 shows a plurality of functional performance requirement statements according to examples of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

Generally speaking, examples of the present disclosure provides for methods and systems for generating model-based systems engineering (MBSE) models from text requirements and generating text requirements from MBSE models. Aspects of the present disclosure provides a technical solution to a technical problem, notably the disclosed components enable a computer system to operate as a special purpose computer system for doing conversions of MBSE models. The methods and systems provided herein allow for reading MBSE models in their native format and derive text sentences with the equivalent meaning. Also the methods and system provided herein allow for reading text sentences and creating specific MBSE models with equivalent meaning. During the processes provided herein, trace links are automatically created that allow for synchronization to either end when a change is detected.

Once the text requirements(s) are created from a model, the requirements and the keywords within the requirements are linked to the associated elements of the model. A diagram is a visual representation of the model and it is the underlying model that is "the truth." The same underlying model elements can be used in multiple diagrams. These links allow for notification of a user when the model changes or automatically updating the keywords and/or requirements when the model changes. For example, linking can be implemented by using unique IDs for each element of the model and/or keyword in the system modeling language platform. The methods and systems provided herein also allow for linked data opportunity such that when the previously mentioned keywords are used in other requirements, the keywords maintain their data links to the associated elements in the model. This allows for linking newly authored requirements to these existing model elements and also notification of changes. Thus, providing a traceable digital thread from the requirements textual statements to the specific MBSE models.

Figure 1:
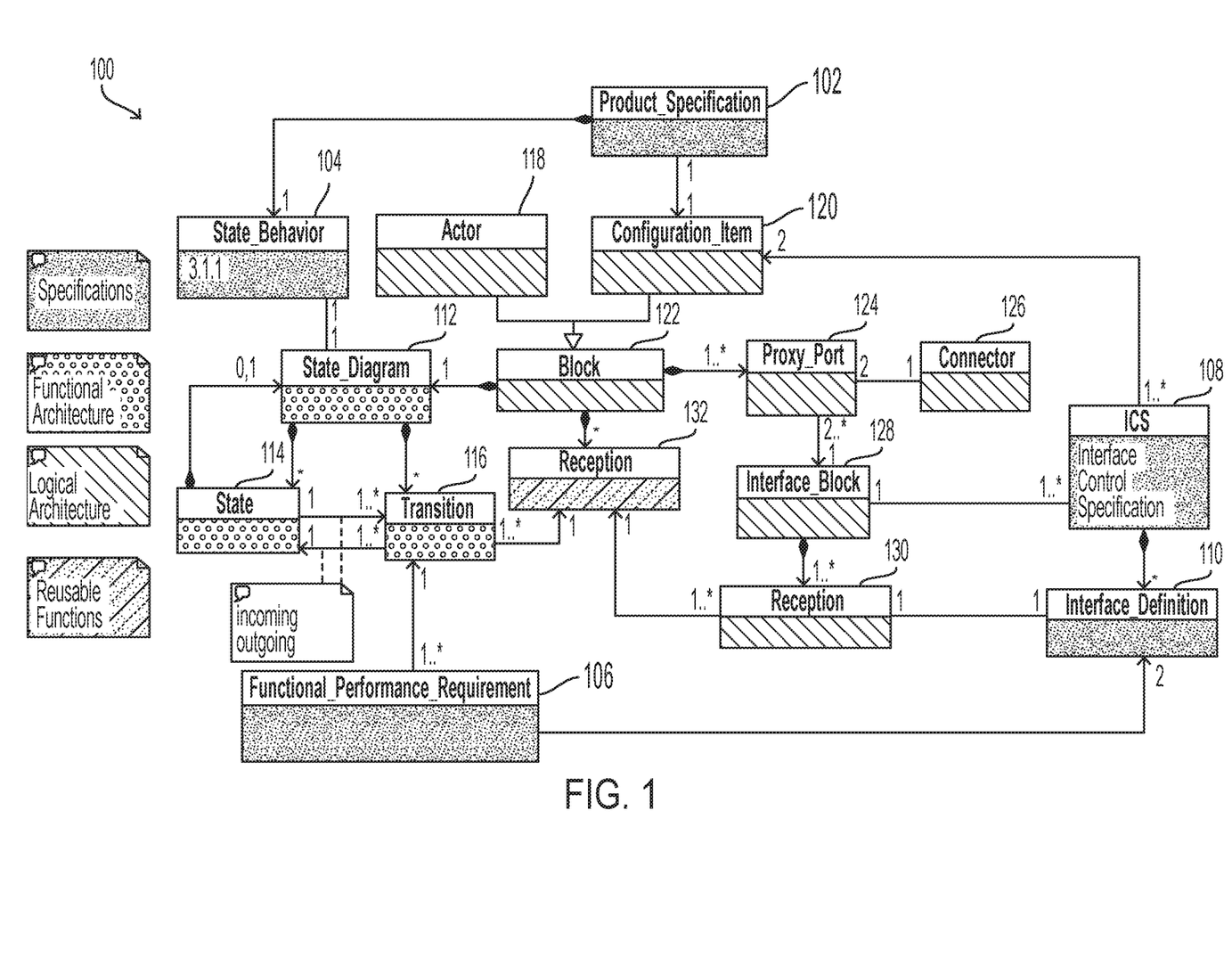
FIG. 1 shows an architecture specification mapping diagram according to examples of the present disclosure.

FIG. 1 shows an architecture specification mapping diagram 100 according to examples of the present disclosure. The architecture specification mapping diagram 100 describes the interrelationships between four types of data, which include specifications, functional architecture, logical architecture, and reusable functions. In FIGS. 1-4 and 7, each of the rectangular blocks represents a system modeling language (SysML) element type. The specification data type includes product specification 102, state behavior 104, functional performance requirement 106, interface control specification (ICS) 108, and interface definition 110. Functional architecture data type includes state diagram 112, state 114, and transition 116. Logical architecture data type includes actor 118, configuration item 120, block 122, proxy port 124, connector 126, interface block 128, and reception 130. Reusable functions data type include reception 132.

Product specification 102 has a single state behavior 104 and a 1 to 1 mapping to a configuration item 120. Each Configuration item 120 can be mapped to one or more ICS 108 and each ICS maps to two Configuration Items. A Configuration Item is a type of Block 122. Block 122 has one or more proxy ports 124. A Proxy Port 124 is typed to an interface block 128 and is connected to another Proxy Port with a Connector 126. An ICS can have multiple Interface Definitions 110 and an Interface Block 128 can have multiple Receptions 130. There is a one to one mapping between Receptions 130 and Interface Definitions 110. Each Block 122 has one State diagram 112. A State Diagram has multiple States 114 and Transitions 116. Each Transition 116 is triggered by a Reception 132. The Reception 130 is linked to the interface definition and the Reception 132 represents its implementation on the Block 122. The Transition Trigger references the Reception 132 on the Block 122 and Reception 130 on the interface maps to the Reception 132 on the Block 122 and to the Interface Definitions 110 in the ICS. There is a one to one mapping between Transitions 116 and functional performance requirements 106.

Figure 2:
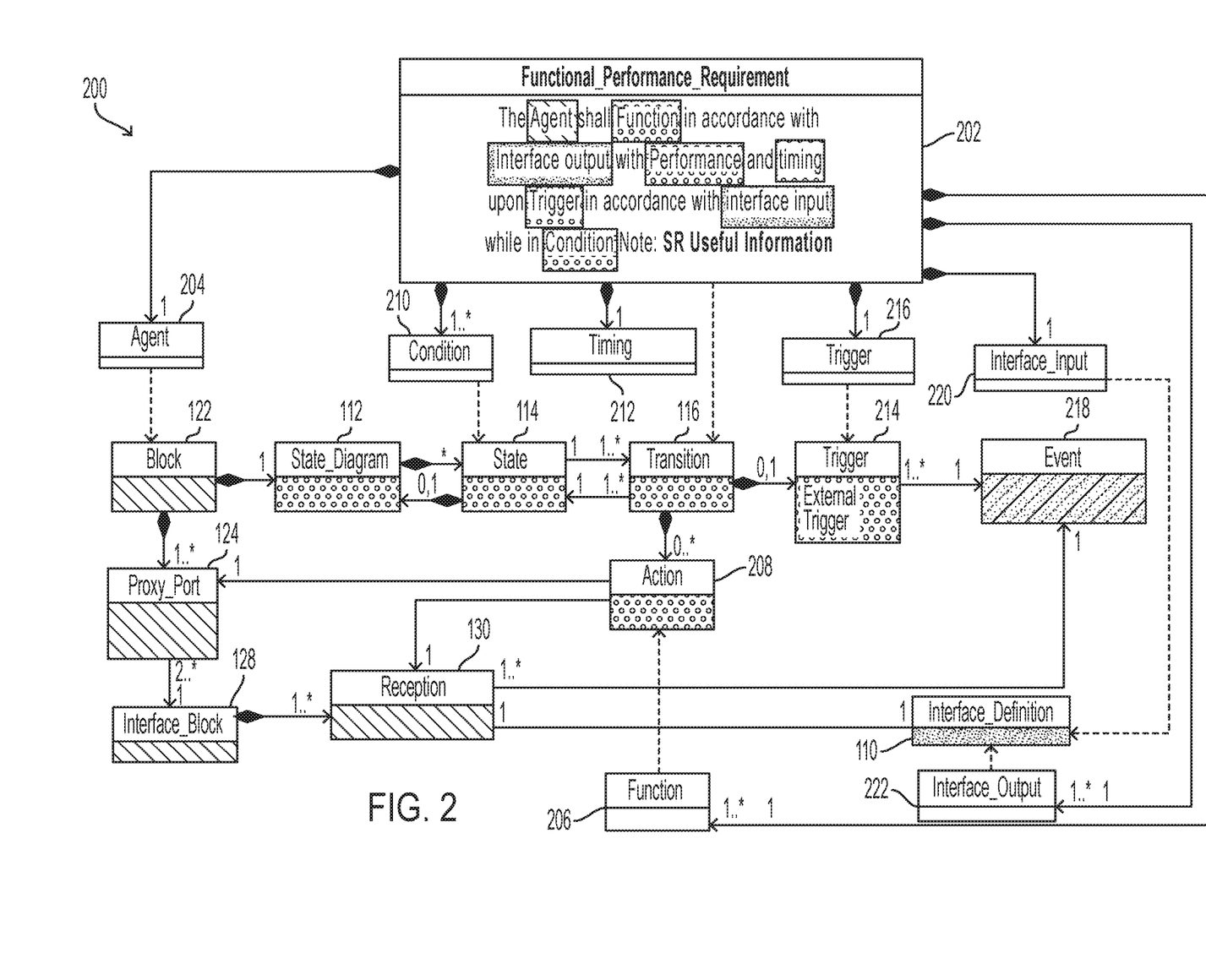
FIG. 2 shows a functional requirements metamodel diagram according to examples of the present disclosure.

FIG. 2 shows a functional requirements metamodel diagram 200 according to examples of the present disclosure. The function performance requirement 202 can have the following form: The Agent shall Function in accordance with Interface output with Performance and timing upon Trigger in accordance with interface input while in Condition Note: SR Useful Information. The boxes 204, 206, 210, 212, 216, 220, 222 are the components of the Functional Requirement Text and the boxes 112, 114, 116, 122, 124, 128, 130, 208, 214, and 218 are model elements. Interface Definition 110 is from the ICS. Agent from the functional performance requirement 202 is taken from agent 204, which is a type of block 122. Function from the functional performance requirement 202 is taken from function 206, which is taken from action 208. Action 208 is part of transition 116 and references a Reception 130 and a Proxy Port 124. Condition from the functional performance requirement 202 is taken from condition 210, which is the "from state" 114. Timing from the functional performance requirement 202 is taken from timing 212, which is not contained in the model. Trigger from the functional performance requirement 202 is taken from trigger 216 which is taken from trigger 214. Trigger 214 is typed to an Event 218. Interface Input from the functional performance requirement 202 is taken from Interface input 220, which is taken from interface definition 110. Interface Output from the functional requirement 202 is taken from Interface Output 222, which is taken from interface definition 110. It is noted that these are two different interface definitions represented by the same type of element 110. The same interface definition is used in one functional requirement as the interface input and another functional requirement as the interface output.

FIG. 3 shows a links view in a raw image file format 300 according to examples of the present disclosure. The links view shows a plurality of Functional Requirements defined by the Requirement Components as defined in FIG. 2. Each component is represented as a link to the information. The links that are shown as categorized by ID number, name, agent, interface input, condition, interface output, and "to state" and related to portions of the requirement performance requirement. As one highlighted example shown in FIG. 3, a requirements statement for a traffic light is shown in the callouts as "The Controller shall" for the agent, "Upon receiving this data" for the interface input, "While in this state" for the condition, "Produce this output" for the interface output, and "And transition to this state" for the to state.

Figure 4:
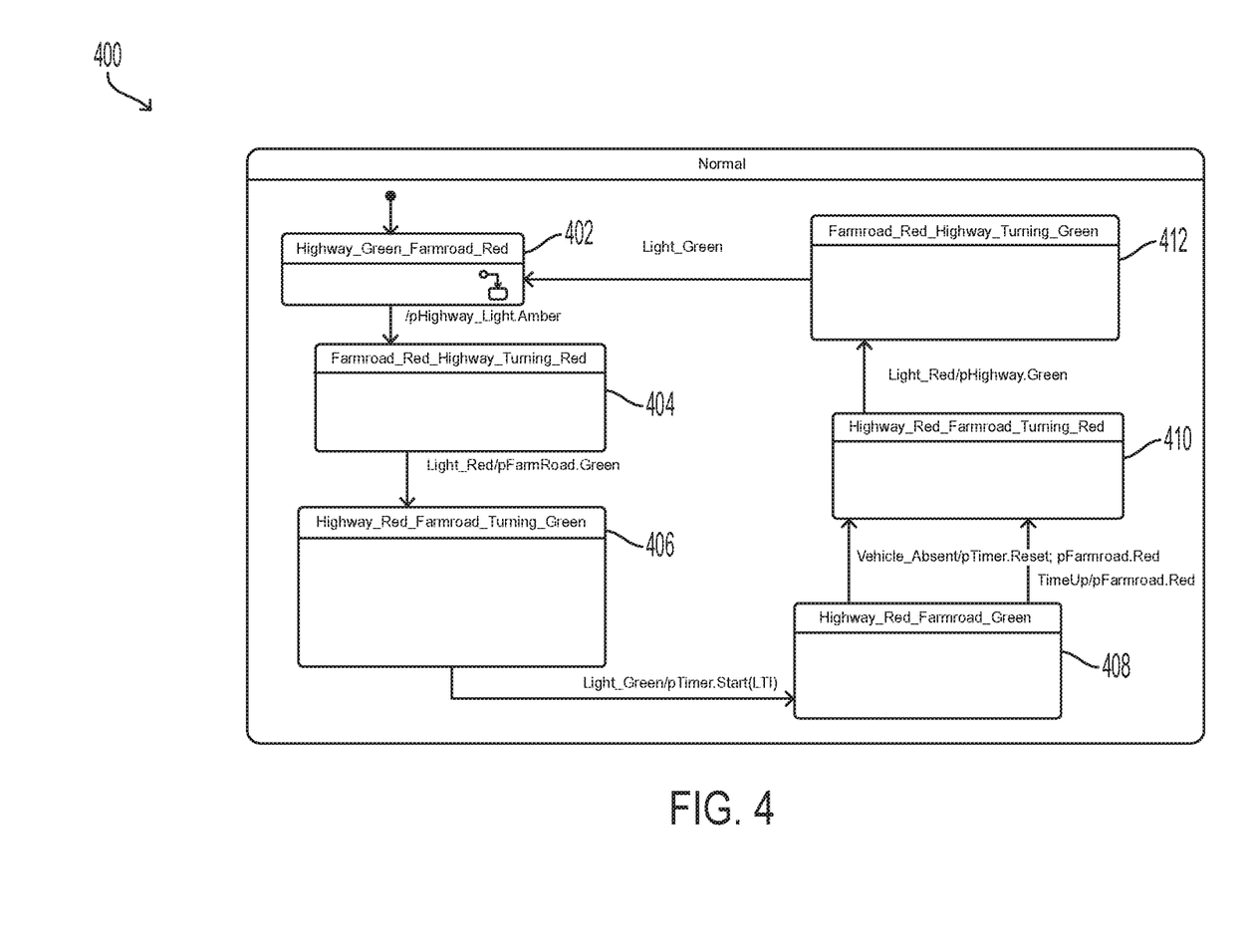
FIG. 4 shows state machine diagram of a requirements statement using systems engineering modeling according to examples of the present disclosure.

FIG. 4 shows state machine diagram 400 (also called a state transition diagram or a state diagram) of a requirements statement of FIG. 3 using systems engineering modeling according to examples of the present disclosure. In this example, state diagram 400 is for a traffic light and the state transition is the transition between the different traffic light indicators for the traffic light. Traffic light indicator state titled "Highway_Green_Farmroad_Red" 402 has the Farm Road light initially in a red state. The Highway Traffic light indicators transitions to red, as indicated by "/pHighway_Light_Amber." Traffic light then enters the state titled "Highway_Red_Highway_Turning_Red" 404, Upon receiving the Light Red signal the Traffic Light transitions as indicated by "Light_Red/pFarmRoad.Green" to the state is titled "Highway_Red_Farmroad_Turning_Green" 406, Upon receiving a Light Green Signal the Traffic Light transitions as indicated by "Light_Green/pTimer.Start (TL1)" to the state titled "Highway_Red_Farmroad_Green" 408. Then when either the Traffic light receives the signal that the vehicle is absent as indicated by "Vehicle_Absent/pTimer.Reset; pFarmroad.Red, or it receives the Time Up signal as indicated by "TimeUp/pFarmroad.Red." the traffic light transitions to "Highway_Red_Farmroad_Turning_Red" 410. Then upon receiving the signal "Light Red" it transitions, as indicated by "Light_Red/pHighway.Green" to the state titled "Farmroad_Red_Highway_Turning_Green" 412. Then upon receiving the signal "Light_Green" It returns to the "Highway_Green_Farmroad_Red" State.

FIG. 5 shows a plurality of functional performance requirement statements 500 according to examples of the present disclosure. The highlighted function performance requirement is "The Traffic_Signal shall transition to the On state upon receiving Power_On in accordance with Interface Power (2215) (where 2215 represents the unique identification number for the interface definition for interface power) while in the Off state."

Figure 6:
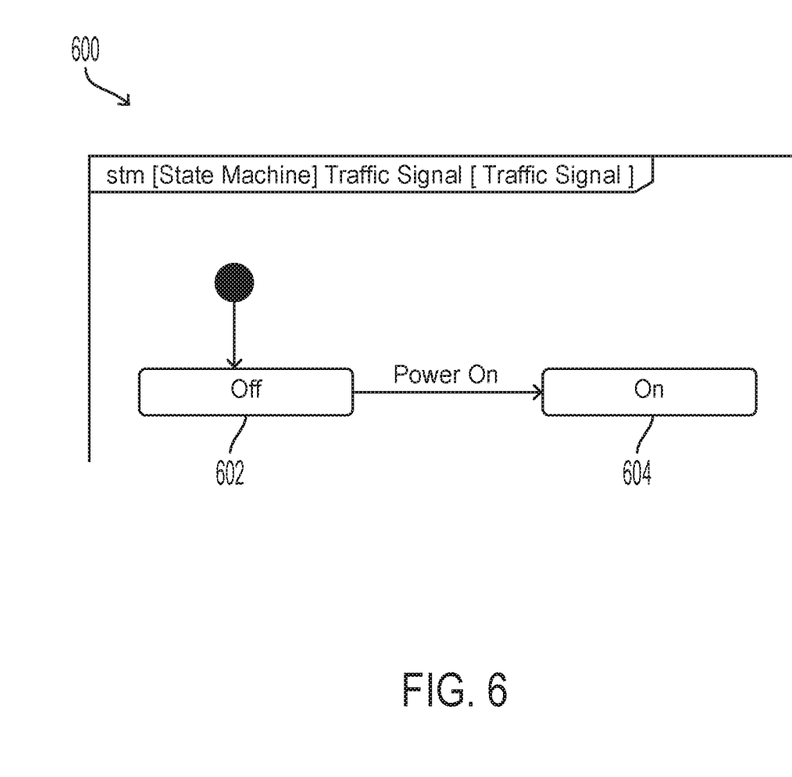
FIG. 6 shows a conversion of a functional performance requirement textual statement to an architecture specification mapping, according to examples of the present disclosure.

FIG. 6 shows a conversion of a functional performance requirement textual statement to an architecture specification mapping 600, according to examples of the present disclosure. Using the traffic signal example discussed above, the textual functional requirement is: The Traffic Signal shall transition to the On state Upon Receiving Power On in accordance with Interface Power (2215) while in the Off State. This textual functional requirement is then parsed into the following: 1) The Agent (Traffic Signal) which becomes the owner of the State Diagram; 2) The "To State" (On) which becomes a state in the State Diagram; 3) The Trigger (Power On) which becomes the Trigger of the Transition in the State Diagram; 4) The Interface Input which is Interface Definition (#2215) in the ICS; 5) The "From State" (Off) which becomes a state in the State Diagram; and 6) The entire Functional Requirement becomes the transition from the "From State" to the "To State" with the Trigger. The state transition diagram 600 includes an Off state 602 and an On state 604.

Figure 7:
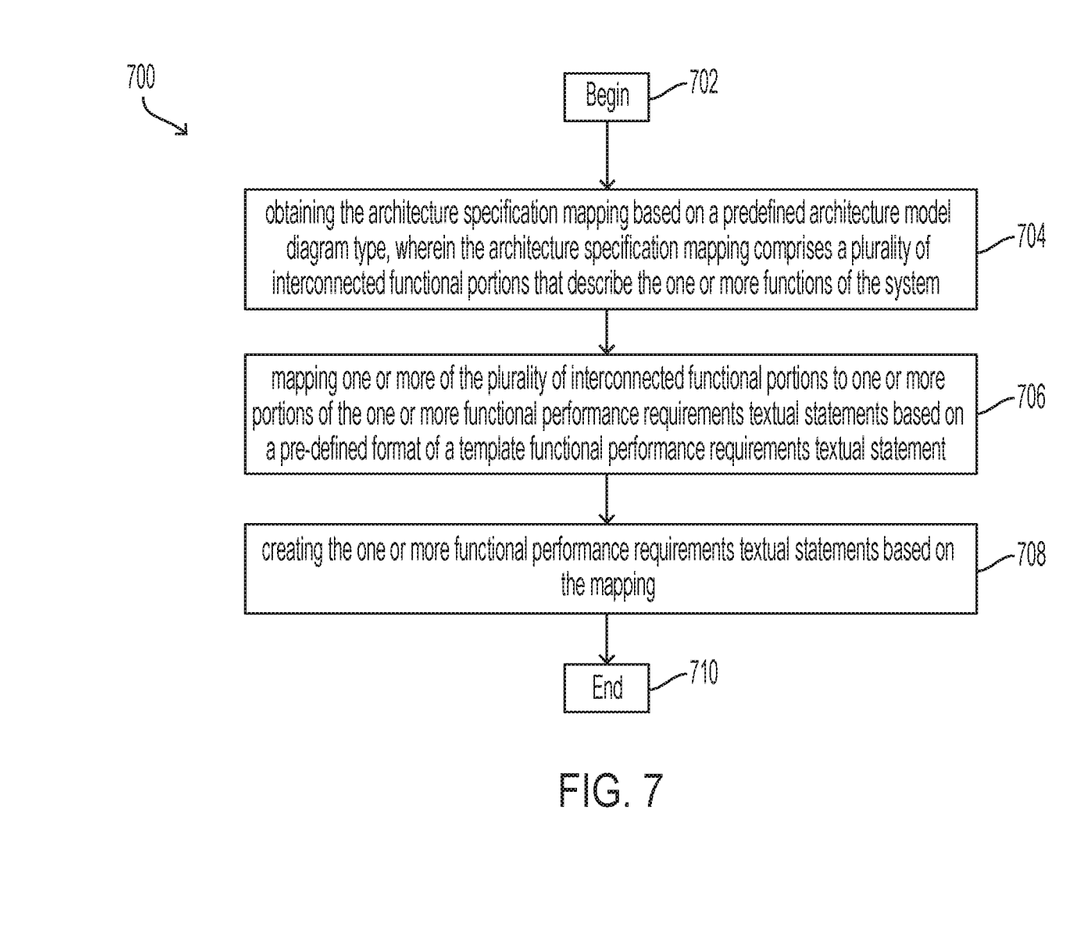
FIG. 7 shows a computer-implemented method for converting an architecture specification mapping of a system to one or more functional performance requirements textual statements describing one or more functions of the system according to examples of the present disclosure.

FIG. 7 shows a computer-implemented method 700 for converting an architecture specification mapping of a system to one or more functional performance requirements textual statements describing one or more functions of the system according to examples of the present disclosure. The computer-implemented method 700 begins at 702 and continues by obtaining, at 704, the architecture specification mapping based on a predefined architecture model diagram type. The architecture specification mapping comprises a plurality of interconnected functional portions that describe the one or more functions of the system. For example, the predefined architecture model diagram type comprises a state transition diagram. In the example where the predefined architecture model diagram type is a state transition diagram, one or more function performance requirements of the one or more functional performance requirements textual statements are obtained from one or more transitions in the state transition diagram.

The computer-implemented method 700 continues by mapping, at 706, one or more of the plurality of interconnected functional portions to one or more portions of the one or more functional performance requirements textual statements based on a predefined format of a template functional performance requirements textual statement. In some examples, the predefined format comprises a subject that is a component of the system, a verb that is an action performed by the component, and a clause that comprises one or more parameters on the action. In some examples, the subject is linked to an agent element of the plurality of interconnected functional portions, the verb is linked to one or more verb-type elements of the plurality of interconnected functional portions, and the clause is linked to one or more clause-type elements of the plurality of interconnected functional portions.

The computer-implemented method 700 continues by creating, at 708, the one or more functional performance requirements textual statements based on the mapping. The computer-implemented method 700 can conclude at 710.

Figure 8:
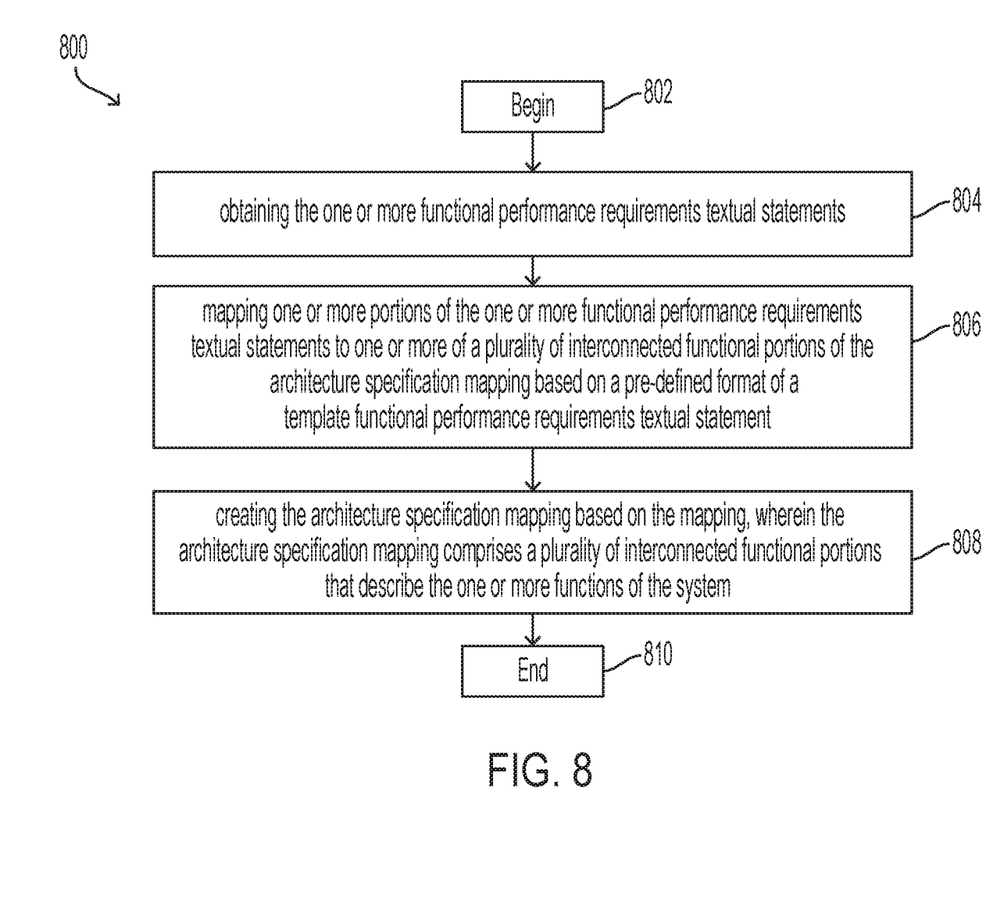
FIG. 8 shows a computer-implemented method for converting one or more functional performance requirements textual statements describing one or more functions of a system to an architecture specification mapping of the system according to examples of the present disclosure.

FIG. 8 shows a computer-implemented method 800 for converting one or more functional performance requirements textual statements describing one or more functions of a system to an architecture specification mapping of the system according to examples of the present disclosure. The computer-implemented method 800 begins at 802 and continues by obtaining, at 804, the one or more functional performance requirements textual statements. The computer-implemented method 800 continues by mapping, at 806, one or more portions of the one or more functional performance requirements textual statements to one or more of a plurality of interconnected functional portions of the architecture specification mapping based on a predefined format of a template functional performance requirements textual statement. In some examples, the predefined architecture model diagram type comprises a state transition diagram.

The computer-implemented method 800 continues by creating, at 808, the architecture specification mapping based on the mapping, wherein the architecture specification mapping comprises a plurality of interconnected functional portions that describe the one or more functions of the system. In some examples, the predefined architecture model diagram type is a state transition diagram and one or more function performance requirements of the one or more functional performance requirements textual statements are obtained from one or more transition elements in the state transition diagram. In some examples, the predefined format comprises a subject that is a component of the system, a verb that is an action performed by the component, and a clause that comprises one or more parameters on the action. In some examples, the subject is linked to an agent element of the plurality of interconnected functional portions, the verb is linked to one or more verb-type elements of the plurality of interconnected functional portions, and the clause is linked to one or more clause-type elements of the plurality of interconnected functional portions. The computer-implemented method 800 concludes at 810.

Figure 9:
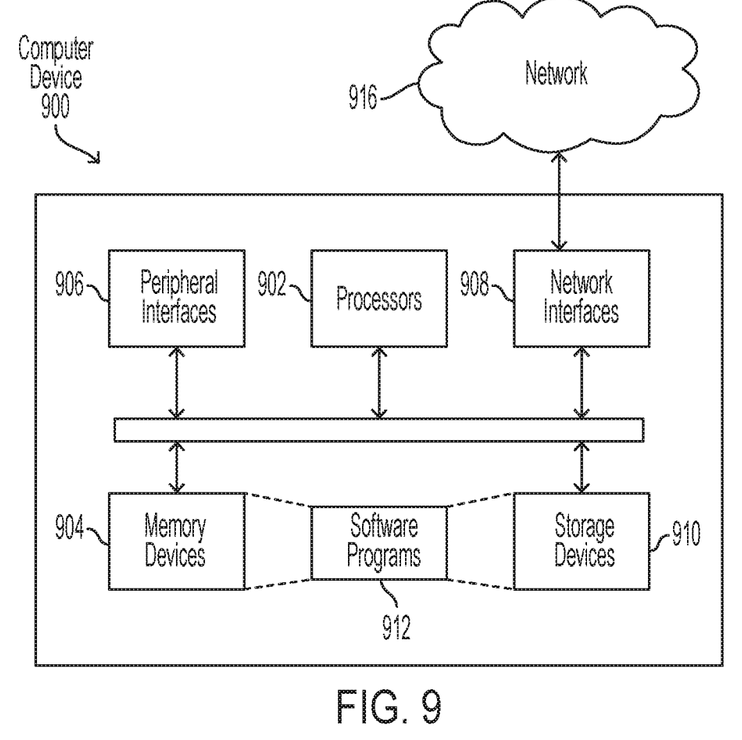
FIG. 9 is an example of a hardware configuration for a computer device, according to examples of the present disclosure.

FIG. 9 is an example of a hardware configuration for a computer device 900, which can be used to perform one or more of the processes described above. The computer device 900 can be any type of computer devices, such as desktops, laptops, servers, etc., or mobile devices, such as smart telephones, tablet computers, cellular telephones, personal digital assistants, etc. As illustrated in FIG. 9, the computer device 900 can include one or more processors 902 of varying core configurations and clock frequencies. The computer device 900 can also include one or more memory devices 904 that serve as a main memory during the operation of the computer device 900. For example, during operation, a copy of the software that supports the above-described operations can be stored in the one or more memory devices 904. The computer device 900 can also include one or more peripheral interfaces 906, such as keyboards, mice, touchpads, computer screens, touchscreens, etc., for enabling human interaction with and manipulation of the computer device 900.

The computer device 900 can also include one or more network interfaces 908 for communicating via one or more networks, such as Ethernet adapters, wireless transceivers, or serial network components, for communicating over wired or wireless media using protocols. The computer device 900 can also include one or more storage devices 910 of varying physical dimensions and storage capacities, such as flash drives, hard drives, random access memory, etc., for storing data, such as images, files, and program instructions for execution by the one or more processors 902.

Additionally, the computer device 900 can include one or more software programs 912 that enable the functionality described above. The one or more software programs 912 can include instructions that cause the one or more processors 902 to perform the processes, functions, and operations described herein, for example, with respect to the processes of FIGS. 7 and 8. Copies of the one or more software programs 912 can be stored in the one or more memory devices 904 and/or on in the one or more storage devices 910. Likewise, the data utilized by one or more software programs 912 can be stored in the one or more memory devices 904 and/or on in the one or more storage devices 910.

In implementations, the computer device 900 can communicate with other devices via a network 916. The other devices can be any types of devices as described above. The network 916 can be any type of network, such as a local area network, a wide-area network, a virtual private network, the Internet, an intranet, an extranet, a public switched telephone network, an infrared network, a wireless network, and any combination thereof. The network 916 can support communications using any of a variety of commercially-available protocols, such as TCP/IP, UDP, OSI, FTP, UPnP, NFS, CIFS, AppleTalk, and the like. The network 916 can be, for example, a local area network, a wide-area network, a virtual private network, the Internet, an intranet, an extranet, a public switched telephone network, an infrared network, a wireless network, and any combination thereof.

The computer device 900 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 900 as described above need not be enclosed within a single enclosure or even located in close proximity to one another. Those skilled in the art will appreciate that the above-described componentry are examples only, as the computer device 900 can include any type of hardware componentry, including any necessary accompanying firmware or software, for performing the disclosed implementations. The computer device 900 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Further, the disclosure comprises embodiments according to the following clauses:

Clause 1. A computer-implemented method comprising:
obtaining, by a hardware processor, an architecture specification of a system based on a predefined architecture model diagram type, wherein the architecture specification comprises a plurality of interconnected functional portions that describe one or more functions of the system;
mapping, by the hardware processor, one or more of the plurality of interconnected functional portions to one or more portions of one or more functional performance requirements textual statements based on a predefined format of a template functional performance requirements textual statement; and
creating, by the hardware processor, the one or more functional performance requirements textual statements based on the mapping.

Clause 2. The computer-implemented method of clause 1, wherein the predefined architecture model diagram type is a state transition diagram (400) and one or more function performance requirements of the one or more functional performance requirements textual statements (500) are obtained from one or more transitions in the state transition diagram.

Clause 3. The computer-implemented method of clauses 1 or 2, wherein the predefined format comprises a subject that is a component of the system, a verb that is an action performed by the component, and a clause that comprises one or more parameters on the action.

Clause 4. The computer-implemented method of clauses 1-3, wherein the subject is linked to an agent block of the plurality of interconnected functional portions, the verb is linked to one or more verb-type elements of the plurality of interconnected functional portions, and the clause is linked to one or more clause-type elements of the plurality of interconnected functional portions.

Clause 5. The computer-implemented method of clauses 1-4, wherein the architecture specification is written using a model-based systems engineering format.

Clause 6. The computer-implemented method of clauses 1-5, wherein agent blocks that are linked provide for user notification of a change in a model.

Clause 7. The computer-implemented method of clauses 1-6, wherein agent blocks that are linked provide for automatic updating of keywords, requirements, or both when a model changes.

Further, the disclosure comprises embodiments according to the following clauses:

Clause 1. A computer-implemented method, the comprising:
obtaining, by a hardware processor, one or more functional performance requirements textual statements;
mapping, by the hardware processor, one or more portions of the one or more functional performance requirements textual statements to one or more of a plurality of interconnected functional portions of an architecture specification mapping based on a pre-defined format of a template functional performance requirements textual statement; and
creating, by the hardware processor, the architecture specification mapping based on the mapping, wherein the architecture specification mapping comprises a plurality of interconnected functional portions that describe the one or more functions of a system.

Clause 2. The computer-implemented method of clause 1, wherein the architecture specification mapping is a state transition diagram and one or more function performance requirements of the one or more functional performance requirements textual statements are obtained from one or more transition blocks in the state transition diagram.

Clause 3. The computer-implemented method of claim 1 or 2, wherein the one or more functional performance requirements textual statements are based on a predefined format that comprises a subject that is a component of the system, a verb that is an action performed by the component, and a clause that comprises one or more parameters on the action.

Clause 4. The computer-implemented method of clauses 1-3, wherein the subject is linked to an agent block of the plurality of interconnected functional portions, the verb is linked to one or more verb-type elements of the plurality of interconnected functional portions, and the clause is linked to one or more clause-type elements of the plurality of interconnected Clause 5. The computer-implemented method of clauses 1-4, wherein the architecture specification is determined using a model-based systems engineering format.

Clause 6. The computer-implemented method of clauses 1-5, wherein agent blocks that are linked provide for user notification of a change in a model.

Clause 7. The computer-implemented method of clauses 1-6, wherein agent blocks that are linked provide for automatic updating of keywords, requirements, or both when a model changes.

Further, the disclosure comprises embodiments according to the following clauses:

Clause 1. A computer system comprising:
a hardware processor;
a non-transitory computer readable medium storing instructions that when executed cause the hardware processor to perform operations comprising:
obtaining an architecture specification mapping of a system based on a predefined architecture model diagram type, wherein the architecture specification mapping comprises a plurality of interconnected functional portions that describe one or more functions of the system;
mapping one or more of the plurality of interconnected functional portions to one or more portions of one or more functional performance requirements textual statements based on a predefined format of a template functional performance requirements textual statement; and
determining the one or more functional performance requirements textual statements based on the mapping.

Clause 2. The computer system of clause 1, wherein the predefined architecture model diagram type is a state transition diagram and one or more function performance requirements of the one or more functional performance requirements textual statements are obtained from one or more transitions in the state transition diagram.

Clause 3. The computer system of clauses 1 or 2, wherein the predefined format comprises a subject that is a component of the system, a verb that is an action performed by the component, and a clause that comprises one or more parameters on the action.

Clause 4. The computer system clauses 1-3, wherein the subject is linked to an agent block of the plurality of interconnected functional portions, the verb is linked to one or more verb-type elements of the plurality of interconnected functional portions, and the clause is linked to one or more clause-type elements of the plurality of interconnected functional portions.

Clause 5. The computer system of clauses 1-4, wherein agent blocks that are linked provide for user notification of a change in a model.

Clause 6. The computer system of clauses 1-5, wherein agent blocks that are linked provide for automatic updating of keywords, requirements, or both when a model changes.

Clause 7. The computer system of clauses 1-6, wherein the architecture specification is determined using a model-based systems engineering format.

Further, the disclosure comprises embodiments according to the following clauses:

Clause 1. A computer system comprising:
  a hardware processor;
  a non-transitory computer readable medium storing instructions that when executed cause the hardware processor to perform operations comprising:
    obtaining, by a hardware processor, one or more functional performance requirements textual statements;
    mapping, by the hardware processor, one or more portions of the one or more functional performance requirements textual statements to one or more of a plurality of interconnected functional portions of an architecture specification mapping based on a pre-defined format of a template functional performance requirements textual statement; and
    creating (806), by the hardware processor, the architecture specification mapping based on the mapping, wherein the architecture specification mapping comprises a plurality of interconnected functional portions that describe the one or more functions of a system.

Clause 2. The computer system of clause 1, wherein the architecture specification mapping is a state transition diagram and one or more function performance requirements of the one or more functional performance requirements textual statements are obtained from one or more transition blocks in the state transition diagram.

Clause 3. The computer system of clauses 1 or 2, wherein the one or more functional performance requirements textual statements are based on a predefined format that comprises a subject that is a component of the system, a verb that is an action performed by the component, and a clause that comprises one or more parameters on the action.

Clause 4. The computer system of clauses 1-3, wherein the subject is linked to an agent block of the plurality of interconnected functional portions, the verb is linked to one or more verb-type elements of the plurality of interconnected functional portions, and the clause is linked to one or more clause-type elements of the plurality of interconnected functional portions.

Clause 5. The computer system of clauses 1-4, wherein the architecture specification is determined using a model-based systems engineering format.

Clause 6. The computer system of clauses 1-5, wherein agent blocks that are linked provide for user notification of a change in a model.

Clause 7. The computer system of clauses 1-6, wherein agent blocks that are linked provide for automatic updating of keywords, requirements, or both when a model changes.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including," "includes," "having," "has," "with," "contains," or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A computer-implemented method comprising:
   obtaining, by a hardware processor, an architecture specification of a system based on a predefined architecture model diagram type, wherein the architecture specification comprises a plurality of interconnected functional portions that describe one or more functions of the system, the predefined architecture model diagram type is a state transition diagram, and each of the plurality of interconnected functional portions represents a system modeling language element type;
   mapping, by the hardware processor, one or more of the plurality of interconnected functional portions to one or more portions of one or more functional performance requirements textual statements based on a predefined format of a template functional performance requirements textual statement, wherein the predefined format comprises a subject that is a component of the system, a verb that is an action performed by the component, and a clause that comprises one or more parameters on the action;
   automatically updating at least one of the one or more functional performance requirements based on a change in state transition diagram; and
   creating, by the hardware processor, the one or more functional performance requirements textual statements based on the mapping and the updating.

2. The computer-implemented method of claim 1, wherein one or more function performance requirements of the one or more functional performance requirements textual statements are obtained from one or more transitions in the state transition diagram.

3. The computer-implemented method of claim 1, wherein the subject is linked to an agent block of the plurality of interconnected functional portions, the verb is linked to one or more verb-type elements of the plurality of interconnected functional portions, and the clause is linked to one or more clause-type elements of the plurality of interconnected functional portions.

4. The computer-implemented method of claim 1, wherein the architecture specification is written using a model-based systems engineering format.

5. The computer-implemented method of claim 1, wherein agent blocks that are linked provide for user notification of a change in a model.

6. The computer-implemented method of claim 1, wherein agent blocks that are linked provide for automatic updating of keywords, requirements, or both when a model changes.

7. The computer-implemented method of claim 1, wherein the architecture specification of the system based on the predefined architecture model diagram type is obtained in a native format of the predefined architecture model diagram type.

8. A computer-implemented method, the comprising:
   obtaining, by a hardware processor, one or more functional performance requirements textual statements;
   mapping, by the hardware processor, one or more portions of the one or more functional performance requirements textual statements to one or more of a plurality of interconnected functional portions of an architecture specification mapping based on a pre-defined format of a template functional performance requirements textual statement, wherein the architecture specification mapping is a state transition diagram and each of the plurality of interconnected functional portions represents a system modeling language element type and the one or more functional performance requirements textual statements are based on a predefined format that comprise a subject that is a component of the system, a verb that is an action performed by the component, and a clause that comprises one or more parameters on the action;
   automatically updating at least one of the one or more functional performance requirements textual statements based on a change in state transition diagram; and
   creating, by the hardware processor, the architecture specification mapping based on the mapping and the updating, wherein the architecture specification mapping comprises a plurality of interconnected functional portions that describe the one or more functions of a system.

9. The computer-implemented method of claim 8, wherein one or more function performance requirements of the one or more functional performance requirements textual statements are obtained from one or more transition blocks in the state transition diagram.

10. The computer-implemented method of claim 8, wherein the subject is linked to an agent block of the plurality of interconnected functional portions, the verb is linked to one or more verb-type elements of the plurality of interconnected functional portions, and the clause is linked to one or more clause-type elements of the plurality of interconnected functional portions.

11. The computer-implemented method of claim 8, wherein the architecture specification is determined using a model-based systems engineering format.

12. The computer-implemented method of claim 8, wherein agent blocks that are linked provide for user notification of a change in a model.

13. The computer-implemented method of claim 8, wherein agent blocks that are linked provide for automatic updating of keywords, requirements, or both when a model changes.

14. The computer-implemented method of claim 8, wherein the architecture specification of the system is based on a predefined architecture model diagram type that is obtained in a native format of the predefined architecture model diagram type.

15. A computer system comprising:
a hardware processor;
a non-transitory computer readable medium storing instructions that when executed cause the hardware processor to perform operations comprising:
obtaining an architecture specification mapping of a system based on a predefined architecture model diagram type, wherein the architecture specification mapping comprises a plurality of interconnected functional portions that describe one or more functions of the system and the predefined architecture model diagram type is a state transition diagram and each of the plurality of interconnected functional portions represents a system modeling language element type;
mapping one or more of the plurality of interconnected functional portions to one or more portions of one or more functional performance requirements textual statements based on a predefined format of a template functional performance requirements textual statement, wherein the predefined format comprises a subject that is a component of the system, a verb that is an action performed by the component, and a clause that comprises one or more parameters on the action;
automatically updating at least one of the one or more functional performance requirements based on a change in state transition diagram; and
determining the one or more functional performance requirements textual statements based on the mapping and the updating.

16. The computer system of claim 15, wherein one or more function performance requirements of the one or more functional performance requirements textual statements are obtained from one or more transitions in the state transition diagram.

17. The computer system claim 15, wherein the subject is linked to an agent block of the plurality of interconnected functional portions, the verb is linked to one or more verb-type elements of the plurality of interconnected functional portions, and the clause is linked to one or more clause-type elements of the plurality of interconnected functional portions.

18. The computer system of claim 15, wherein agent blocks that are linked provide for user notification of a change in a model.

19. The computer system of claim 15, wherein agent blocks that are linked provide for automatic updating of keywords, requirements, or both when a model changes.

20. The computer system of claim 15, wherein the architecture specification of the system based on the predefined architecture model diagram type is obtained in a native format of the predefined architecture model diagram type.

* * * * *